(12) United States Patent
Adler et al.

(10) Patent No.: US 8,514,269 B2
(45) Date of Patent: Aug. 20, 2013

(54) DE-ALIASING DEPTH IMAGES

(75) Inventors: Avishai Adler, Haifa (IL); Sagi Katz, Yokneam (IL); Guy Gilboa, Kiryat Tivon (IL); John Tardif, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 514 days.

(21) Appl. No.: 12/732,918

(22) Filed: Mar. 26, 2010

(65) Prior Publication Data

US 2011/0234756 A1     Sep. 29, 2011

(51) Int. Cl.
*G06K 9/00*     (2006.01)
(52) U.S. Cl.
USPC .................. 348/46; 348/51; 353/28; 382/154
(58) Field of Classification Search
USPC ............................................ 348/51; 353/28
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |

(Continued)

FOREIGN PATENT DOCUMENTS

| CN | 101556696 A | 10/2009 |
|---|---|---|
| CN | 101605270 A | 12/2009 |

(Continued)

OTHER PUBLICATIONS

Chinese Voluntary Amendments dated Dec. 15, 2011, Chinese Patent Application No. 201110081374.7 filed Mar. 24, 2011, 9 pages.

(Continued)

*Primary Examiner* — David Czekaj
*Assistant Examiner* — Tsion B Owens
(74) *Attorney, Agent, or Firm* — Vierra Magen Marcus LLP

(57) ABSTRACT

Techniques are provided for de-aliasing depth images. The depth image may have been generated based on phase differences between a transmitted and received modulated light beam. A method may include accessing a depth image that has a depth value for a plurality of locations in the depth image. Each location has one or more neighbor locations. Potential depth values are determined for each of the plurality of locations based on the depth value in the depth image for the location and potential aliasing in the depth image. A cost function is determined based on differences between the potential depth values of each location and its neighboring locations. Determining the cost function includes assigning a higher cost for greater differences in potential depth values between neighboring locations. The cost function is substantially minimized to select one of the potential depth values for each of the locations.

15 Claims, 10 Drawing Sheets

(56) References Cited

U.S. PATENT DOCUMENTS

| | | |
|---|---|---|
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,502,489 A | 3/1996 | Kim et al. |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,930,383 A | 7/1999 | Netzer |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,408,627 B2 | 8/2008 | Bamji et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |

| | | | |
|---|---|---|---|
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,142,023 | B2 * | 3/2012 | Lim ............................. 353/28 |
| 2008/0026838 | A1 | 1/2008 | Dunstan et al. |
| 2008/0152191 | A1 | 6/2008 | Fujimura et al. |
| 2008/0252882 | A1 | 10/2008 | Kesterson |
| 2009/0022396 | A1 | 1/2009 | Watanabe et al. |
| 2009/0048482 | A1 | 2/2009 | Hong et al. |
| 2009/0060286 | A1 | 3/2009 | Wheeler et al. |
| 2009/0110292 | A1 | 4/2009 | Fujimura et al. |
| 2009/0141933 | A1 | 6/2009 | Wagg |
| 2009/0221368 | A1 | 9/2009 | Yen et al. |
| 2009/0244309 | A1 * | 10/2009 | Maison et al. ............ 348/222.1 |
| 2009/0315915 | A1 | 12/2009 | Dunn et al. |
| 2010/0020209 | A1 * | 1/2010 | Kim ............................ 348/294 |
| 2010/0182410 | A1 * | 7/2010 | Verburgh et al. .............. 348/51 |

FOREIGN PATENT DOCUMENTS

| | | |
|---|---|---|
| CN | 101640809 A | 2/2010 |
| CN | 101254344 B | 6/2010 |
| EP | 0583061 A2 | 2/1994 |
| EP | 2128693 A1 | 12/2009 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2009004527 A2 | 1/2009 |
| WO | WO2009059065 | 5/2009 |

OTHER PUBLICATIONS

Partial English Translation of Chinese Voluntary Amendments dated Dec. 15, 2011, Chinese Patent Application No. 201110081374.7 filed Mar. 24, 2011, 5 pages.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Stoykova, "3-D Time-varying Scene Capture Technologies—a Survey", IEEE Transactions on Circuits and Systems for Video Technology, Nov. 2007, vol. 17, No. 11, pp. 1568-1586.

Gokturk, "A Time-Of-Flight Depth Sensor—System Description, Issues and Solutions", Conference on Computer Vision and Pattern Recognition Workshop, vol. 3, p. 35, Jun.-Jul. 2004, IEEE Computer Society, Washington, DC, USA.

Schuon, "High-Quality Scanning Using Time-Of-Flight Depth Superresolution", IEEE Computer Society Conference on Computer Vision and Pattern Recognition Workshops, Jun. 2008, Anchorage, AK, USA.

Krumm, "Local Spatial Frequency Analysis for Computer Vision", Technical Report CMU-RI-TR-90-11, Robotics Institute,Carnegie Mellon University, May 1990.

Parvizi, "Real-time 3D Head Tracking Based on Time-of-flight Depth Sensor", 19th IEEE International Conference on Tools with Artificial Intelligence, pp. 517-521, Oct. 2007, IEEE Computer Society, Washington, DC, USA.

Gallo, "Robust Curb and Ramp Detection for Safe Parking Using the Canesta TOF Camera", IEEE Computer Society Conference on Computer Vision and Pattern Recognition Workshops, Jun. 2008, Anchorage, AK, USA.

Suresh, "Super-Resolution Using Motion and Defocus Cues", IEEE International Conference on Image Processing, Nov. 12, 2007, pp. IV-213—IV-216, San Antonio, TX, USA.

Murino, "Three-Dimensional Image Generation and Processing in Underwater Acoustic Vision", Invited Paper, Proceedings of the IEEE, pp. 1903-1946, vol. 88, No. 12, Dec. 2000.

Benko, "Depth Touch: Using Depth-Sensing Camera to Enable , Freehand Interactions on and Above the Interactive Surface", Technical Report, MSR-TR-2009-23, Mar. 2009, 8 pages.

Kolmogorov, "Comparison of Energy Minimization Algorithms for Highly Connected Graphs", Proceedings of the European Conference in Computer Vision, Jun. 2006, Springer-Verlag.

Szeliski, "A Comparative Study of Energy Minimization Methods for Markov Random Fields", Proceedings of the European Conference in Computer Vision, Jun. 2006, Springer-Verlag.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

HE, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Response to Chinese Office Action dated Dec. 3, 2012, Chinese Patent Application No. 201110081374.7, filed Mar. 24, 2011, 21 pages.

Chinese Office Action dated Mar. 13, 2013, Chinese Applications No. 201110081374.7, filed Mar. 24, 2011, 9 pages.

Partial English Translation of Chinese Office Action dated Mar. 13, 2013, Chinese Application No. 201110081374.7, filed Mar. 24, 2011, 3 pages.

Chinese Office Action dated Nov. 5, 2012, Chinese Patent Application No. 201110081374.7, filed Mar. 24, 2011, 10 pages.

Partial English Translation of Chinese Office Action dated Nov. 5, 2012, Chinese Patent Application No. 201110081374.7, filed Mar. 24, 2011, 3 pages.

Response to Chinese Office Action dated Dec. 2, 2012, Chinese Patent Application No. 201110081374.7, filed Mar. 24, 2011, 12 pages.

Partial English Translation of Response to Chinese Office Action dated Dec. 2, 2012, Chinese Patent Application No. 201110081374.7, filed Mar. 24, 2011, 6 pages.

English Abstract of Foreign Patent Document CN 101556696, published Oct. 14, 2009, Univ Zhejiang.

English Abstract of Foreign Patent Document CN 101605270, published Dec. 16, 2009, Univ Tsinghua.

English Abstract of Foreign Patent Document CN 101640809, published Feb. 3, 2010, Univ Zhejiang.

Response to Chinese Office Action dated May 7, 2013, Chinese Patent Application No. 201110081374.7 filed Mar. 24, 2011, 11 pages.

English Summary and Claim Amendments of the Response to Chinese Office Action dated May 7, 2013, Chinese Patent Application No. 201110081374.7 filed Mar. 24, 2011, 6 pages.

* cited by examiner

DE-ALIASING DEPTH IMAGES

BACKGROUND

A depth camera system obtains data regarding the location of a human or other object in a physical space. This information may be referred to as "depth information." The depth information may be input to an application in a computing system for a wide variety of applications. Many applications are possible, such as for military, entertainment, sports and medical purposes. For instance, depth information regarding a human can be mapped to a three-dimensional (3-D) human skeletal model and used to create an animated character or avatar.

To determine depth information the depth camera may project light onto an object in the camera's field of view. The light reflects off the object and back to the camera, where it is processed to determine the depth information. One technique for determining distance to the object is based on the round trip time-of-flight of the light. Some techniques modulate the light and determine distance based on the phase difference between the transmitted and received light.

However, aliasing may occur with some time-of-flight techniques due to the periodicity of the modulated light. Aliasing occurs because it is possible for the light returning from objects at two different distances to have the same phase shift relative to the transmitted light. Stated another way, the phase shift of light reflected from some objects may be greater than 360 degrees, with phase shifts greater than 360 being indistinguishable from phase shifts less than 360 degrees. The term "depth window" may be used to refer to the depth that can be detected without encountering the aliasing effect. For example, the depth window could be 2.5 meters for a given camera.

One de-aliasing technique is to modulate the light at several different frequencies. For each modulated frequency, the measurement indicates that the object could be at one of several possible distances. One of the distances is correct, and the others are due to aliasing. However, by analyzing the set of possible distances for all modulated frequencies the correct distance may be determined. However, this technique requires that the light be modulated at several different frequencies. Therefore, additional time is required to collect the data. Also, the circuitry may need to be more complex to be able to modulate the light at different frequencies. Also, even with a few different modulated frequencies it is not guaranteed that the aliasing effect can be removed.

Therefore, further refinements are needed which allow a more accurate determination of the depth of objects within a field of view of a depth camera. Improved techniques for de-aliasing when performing depth detection are desired. The techniques should be compatible with existing depth detection cameras.

SUMMARY

Techniques are provided for de-aliasing a depth image. Techniques described herein provide an accurate determination of the depth of objects within a field of view of a depth camera. Techniques described herein are compatible with existing depth detection cameras.

One embodiment includes a machine-implemented method of de-aliasing a depth image. The method includes accessing a depth image that has a depth value for a plurality of locations in the depth image. Each location has one or more neighbor locations. Potential depth values are determined for each of the plurality of locations based on the depth value in the depth image for the location and potential aliasing in the depth image. A cost function is determined based on differences between the potential depth values of each location and its neighboring locations. Determining the cost function includes assigning a higher cost for greater differences in potential depth values between neighboring locations. The cost function is substantially minimized to select one of the potential depth values for each of the locations.

One embodiment includes an apparatus comprising a processor and a computer readable storage medium coupled to the processor. The computer readable storage medium has instructions which, when executed on the processor cause the processor to access a depth image that includes a depth value for a plurality of locations. Each of the locations has one or more neighbor locations. The instructions further cause the processor to determine potential depth values for each of the plurality of locations based on the depth value in the depth image and potential aliasing in the depth image. The instructions further cause the processor to determine a cost function based on differences between the potential depth values of each location and its one or more neighbor locations. To determine the cost function, the processor assigns a higher cost for greater differences in potential depth values between a pair of neighbor locations. The instructions further cause the processor to substantially minimize the cost function to select one of the potential depth values for each of the locations.

One embodiment includes a machine-implemented method that includes the following. A depth image that includes a plurality of pixels is generated. Each pixel has one or more neighbor pixels and has a depth value. The depth image has a depth window. Potential depth values are determined for each of the plurality of pixels based on the depth window and the depth value in the depth image for the pixel. A graph is generated that includes a plurality of layers of nodes. Each pixel is represented by one node in each layer. The potential depth values for a given pixel are represented by nodes in different layers. Nodes that correspond to neighbor pixels are connected by edges. A cost is assigned to each of the edges. The cost of a given edge is based on a depth difference between the potential depth values of the two nodes that are connected by the edge. The graph is reduced to a single layer that substantially minimizes costs of remaining edges. Each of the pixels has one node in the reduced graph.

This summary is provided to introduce a selection of concepts in a simplified form that are further described below in the description. This summary is not intended to identify key features or essential features of the claimed subject matter, nor is it intended to be used to limit the scope of the claimed subject matter.

DETAILED DESCRIPTION

Techniques are provided for de-aliasing a depth image. The depth image may have been generated based on phase differences between a transmitted and received modulated light beam. As an example, the transmitted light beam may have been projected from a depth camera, reflected off from one or more objects, and received back at the depth camera. The aliasing may be a function of the modulation frequency of the transmitted light.

Figure 1:
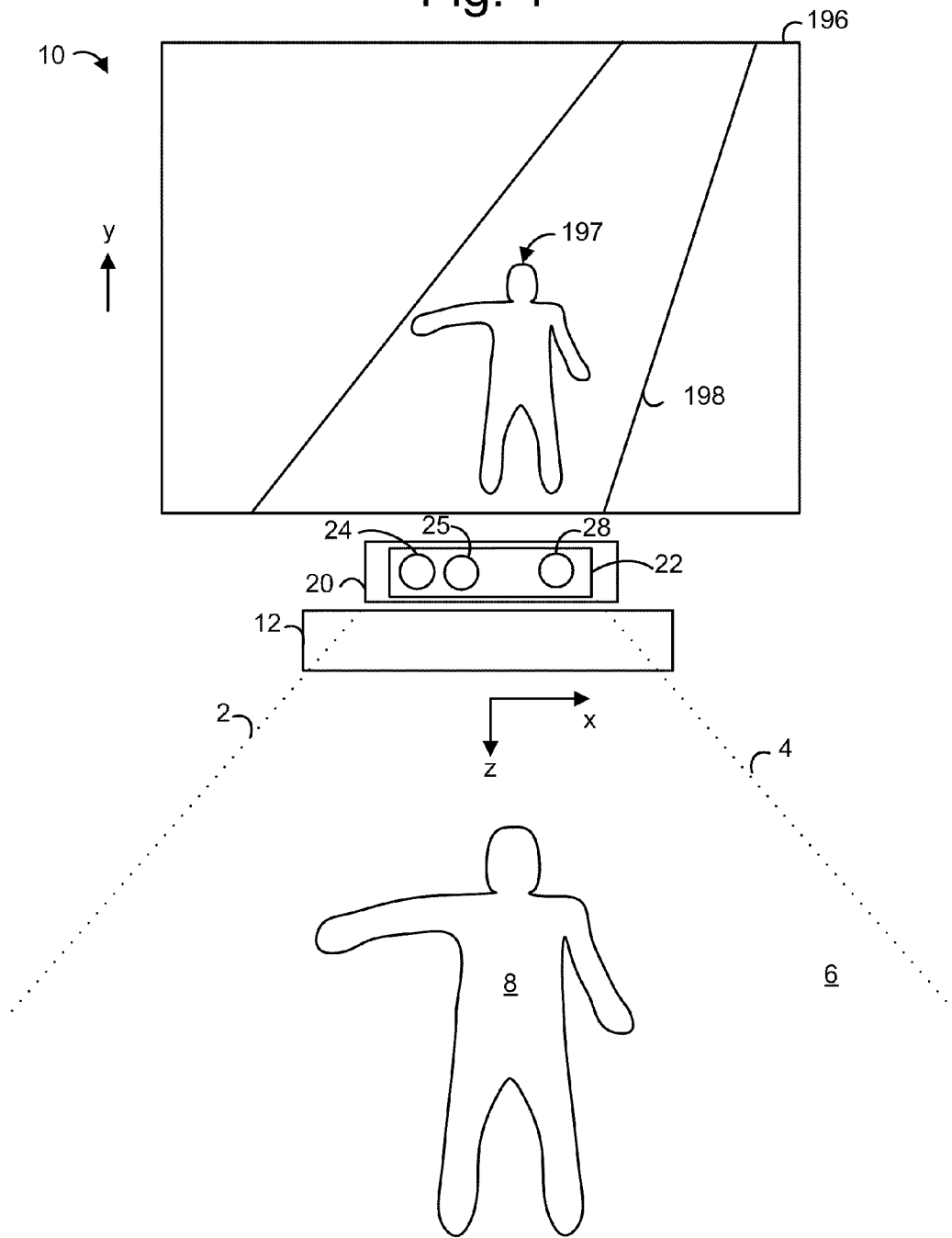
FIG. 1 depicts an example embodiment of a motion capture system.

In some embodiments, de-aliasing of a depth image is used in a motion capture system. The motion capture system may generate an original depth image, which embodiments de-alias. The de-aliased depth image may be used by the motion capture system 10 for a variety of purposes. It will be understood that de-aliasing a depth image is not limited to use in a motion capture system. FIG. 1 depicts an example of a motion capture system 10 in which a person interacts with an application. The motion capture system 10 includes a display 196, a depth camera system 20, and a computing environment or apparatus 12. The depth camera system 20 may include an image camera component 22 having a depth detection light transmitter 24, depth detection light receiver 25, and a red-green-blue (RGB) camera 28. In one embodiment, the depth detection light transmitter 24 emits a collimated light beam. Examples of collimated light include, but are not limited to, Infrared (IR) and laser. In one embodiment, the depth detection light component is an LED. Light that reflects off from an object 8 in the field of view is detected by the depth detection light receiver 25.

A user, also referred to as a person or player, stands in a field of view 6 of the depth camera system 20. Lines 2 and 4 denote a boundary of the field of view 6. In this example, the depth camera system 20, and computing environment 12 provide an application in which an avatar 197 on the display 196 track the movements of the object 8 (e.g., a user) For example, the avatar 197 may raise an arm when the user raises an arm. The avatar 197 is standing on a road 198 in a 3-D virtual world. A Cartesian world coordinate system may be defined which includes a z-axis which extends along the focal length of the depth camera system 20, e.g., horizontally, a y-axis which extends vertically, and an x-axis which extends laterally and horizontally. Note that the perspective of the drawing is modified as a simplification, as the display 196 extends vertically in the y-axis direction and the z-axis extends out from the depth camera system 20, perpendicular to the y-axis and the x-axis, and parallel to a ground surface on which the user stands.

Generally, the motion capture system 10 is used to recognize, analyze, and/or track an object. The computing environment 12 can include a computer, a gaming system or console, or the like, as well as hardware components and/or software components to execute applications.

The depth camera system 20 may include a camera which is used to visually monitor one or more objects 8, such as the user, such that gestures and/or movements performed by the user may be captured, analyzed, and tracked to perform one or more controls or actions within an application, such as animating an avatar or on-screen character or selecting a menu item in a user interface (UI).

The motion capture system 10 may be connected to an audiovisual device such as the display 196, e.g., a television, a monitor, a high-definition television (HDTV), or the like, or even a projection on a wall or other surface, that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

The object 8 may be tracked using the depth camera system 20 such that the gestures and/or movements of the user are captured and used to animate an avatar or on-screen character and/or interpreted as input controls to the application being executed by computer environment 12.

Some movements of the object 8 may be interpreted as controls that may correspond to actions other than controlling an avatar. For example, in one embodiment, the player may use movements to end, pause, or save a game, select a level, view high scores, communicate with a friend, and so forth. The player may use movements to select the game or other application from a main user interface, or to otherwise navigate a menu of options. Thus, a full range of motion of the object 8 may be available, used, and analyzed in any suitable manner to interact with an application.

The person can hold an object such as a prop when interacting with an application. In such embodiments, the movement of the person and the object may be used to control an application. For example, the motion of a player holding a racket may be tracked and used for controlling an on-screen racket in an application which simulates a tennis game. In another example embodiment, the motion of a player holding a toy weapon such as a plastic sword may be tracked and used for controlling a corresponding weapon in the virtual world of an application which provides a pirate ship.

The motion capture system 10 may further be used to interpret target movements as operating system and/or application controls that are outside the realm of games and other applications which are meant for entertainment and leisure. For example, virtually any controllable aspect of an operating system and/or application may be controlled by movements of the object 8.

Figure 2:
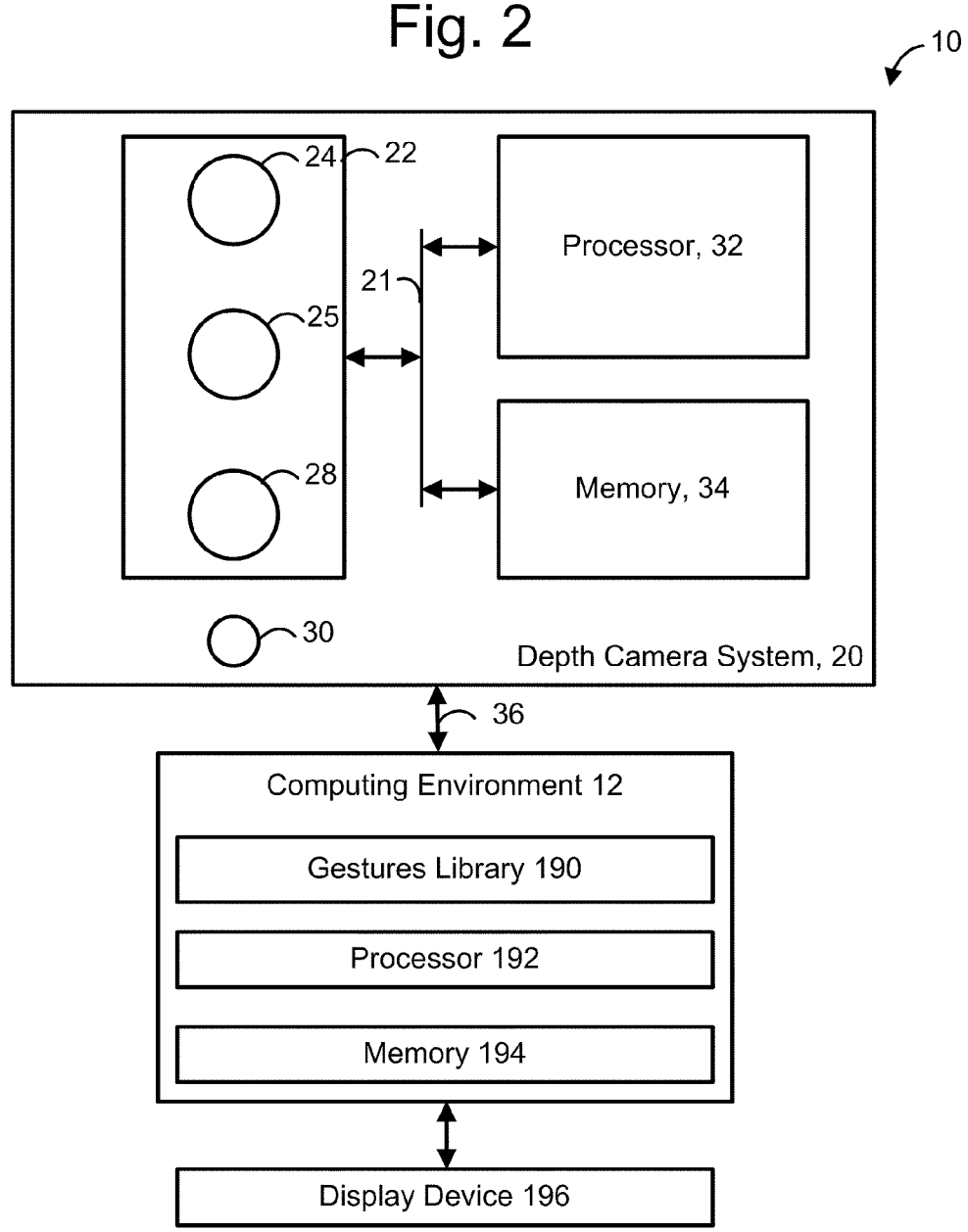
FIG. 2 depicts an example block diagram of the motion capture system of FIG. 1.

FIG. 2 depicts an example block diagram of the motion capture system 10 of FIG. 1a. The depth camera system 20 may be configured to capture video with depth information including a depth image that may include depth values. Technique for determining de-aliasing the depth image are described herein. The depth camera system 20 may organize the depth information into "Z layers," or layers that may be perpendicular to a Z-axis extending from the depth camera system 20 along its line of sight.

The depth camera system 20 may include an image camera component 22, such as a depth camera that captures the depth image of a scene in a physical space. The depth image may include a two-dimensional (2-D) pixel area of the captured scene, where each pixel in the 2-D pixel area has an associated depth value which represents either a linear distance from the image camera component 22 (radial distance) or the Z component of the 3D location viewed by the pixel (perpendicular distance).

The image camera component 22 may include a depth detection light transmitter 24 and a depth detection light receiver 25 to capture depth information. For example, depth camera system 20 may use the depth detection light transmitter 24 to emit light onto the physical space and use depth detection light receiver 25 to detect the reflected light from the surface of one or more objects in the physical space.

In some embodiments, the depth detection light transmitter 24 transmits pulsed infrared light such that the time between an outgoing light pulse and a corresponding incoming light pulse may be measured and used to determine a physical distance from the depth camera system 20 to a particular location on the objects in the physical space. The light may be modulated at desired frequency. The phase of the outgoing modulated light wave may be compared to the phase of the incoming light wave to determine a phase difference. The phase difference may then be used to determine a physical distance from the depth camera system 20 to a particular location on the targets or objects.

The depth camera system 20 may have a depth window that is a function of the modulation frequency of the light used to determine depth. For example, the depth window could be 2.5 meters for a given camera. In some embodiments, aliasing is a function of the depth window. For example, different objects with actual depths of "x+n*depth window" might all be determined to be at the distance x. In this example, "n" may be any positive integer.

The image camera component 22 may also generate brightness information (e.g., a brightness image), which may be used to help de-alias the depth image. In one embodiment, the same process that generates the depth image based on time-of-flight information also generates brightness information.

The red-green-blue (RGB) camera 28 may be used to capture a visible light image. The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the image camera component 22. The processor 32 may include a standardized processor, a specialized processor, a microprocessor, or the like that may execute instructions including, for example, instructions for receiving a depth image and de-aliasing the depth image.

The depth camera system 20 may further include a memory component 34 that may store instructions that are executed by the processor 32, as well as storing images or frames of images captured by the RGB camera, or any other suitable information, images, or the like. According to an example embodiment, the memory component 34 may include random access memory (RAM), read only memory (ROM), cache, flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by the RGB camera 28 to the computing environment 12 via the communication link 36. The computing environment 12 may then use the depth information, and captured images to control an application. For example, as shown in FIG. 2, the computing environment 12 may include a gestures library 190, such as a collection of gesture filters, each having information concerning a gesture that may be performed (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The computing environment may also include a processor 192 for executing instructions which are stored in a memory 194 to provide audio-video output signals to the display device 196 and to achieve other functionality.

Figure 3:
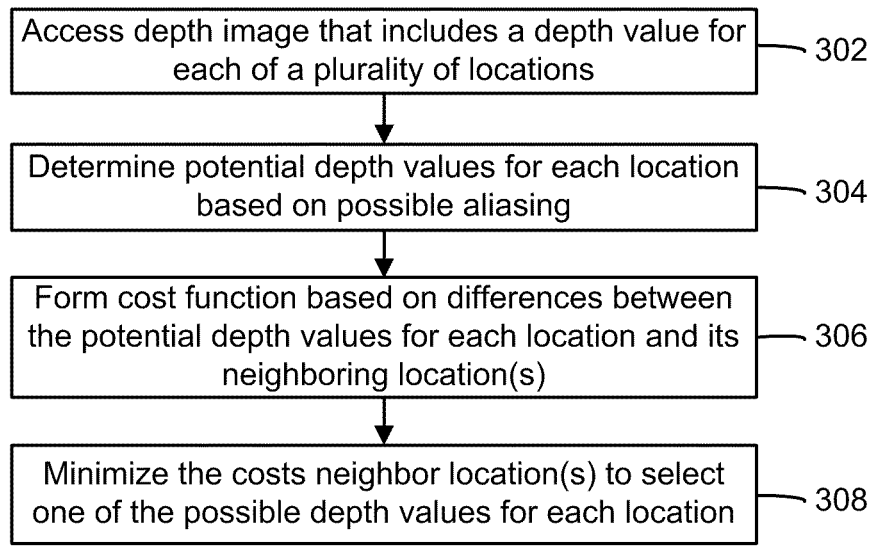
FIG. 3 is a flowchart of one embodiment of a process of de-aliasing a depth image.

FIG. 3 is a flowchart of one embodiment of a process 300 of de-aliasing a depth image. Process 300 may be used in a motion capture system 10 such as the example system 10 in FIG. 1. For example, process 300 might be performed by depth camera system 20 or computing environment 12. In step 302, a depth image is accessed. The depth image includes a depth value for different locations. Each location has one or more neighbor locations. In one embodiment, the depth image includes a plurality of pixels with each pixel neighboring one or more adjacent pixels. Thus, a location in the depth image may correspond to a pixel. Each pixel has a depth value as determined by, for example, a depth camera 20.

Figure 5A:
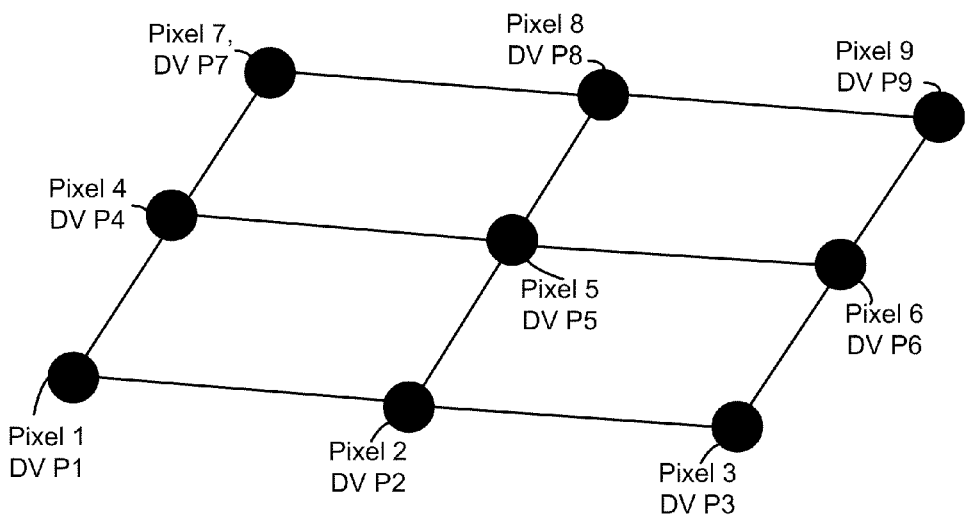
FIG. 5A depicts an example of neighboring relationships of pixels in a depth image.

FIG. 5A depicts an example of neighbor relationships of pixels in a depth image. In this example, there are nine pixels with each pixel having up to four neighbors, as indicated by the lines joining the pixels. In this example, the depth image values are organized as a matrix or pixels. For ease of illustration only a 3×3 portion of the matrix is illustrated. Note that it is not required that the depth image be organized as a matrix. In this example, a pixel may have a neighbor above, below, to the left, and to the right. In other embodiments, a pixel may have a diagonal neighbor. For example, pixel 5 could be a neighbor to Pixel 1, Pixel 3, Pixel 7 and Pixel 9. Each pixel has a depth value, as indicated by labels such, as DV P1 for the depth value of Pixel 1.

Note that it is not required for each location in the depth image to correspond to a pixel. For example, a location in the depth image could correspond to a group of pixels. In one embodiment, a location is a group of contiguous pixels having similar depth values.

The depth image may be generated by a depth camera 20. The depth image may have aliasing due to the way in which the depth image was generated. In one embodiment, the depth image is generated based on time-of-flight information. The aliasing may be due to a limited "depth window" of the depth camera 20. In other words, the modulation frequency of the light used to determine depth may result in a specific depth window due to the fact that depth is determined based on phase differences between the transmitted and received light. In one embodiment, the modulation frequency or the depth window is an input to process 300.

In step 304, potential depth values are determined for each of the locations in the original depth image based on possible aliasing in the depth image. For example, if a location has a depth value of 2.0 meters and the depth window is 2.5 meters, then the potential depth values could include the set: {2.0, 4.5, 7.0, 9.5} meters. Note that the depth value in the original depth image is one of the potential depth values.

In step 306, a cost function is formed based on differences between the potential depth values of each location and its one or more neighbor locations. Determining the cost function may include assigning a higher cost for greater differences in potential depth values between a pair of neighbor locations. Further details are discussed below.

In step 308, the cost function is substantially minimized to select one of the potential depth values for each of the locations. This selected depth value for each location is used to form the de-aliased image. For example, the value 4.5 m might be selected from the set: {2.0, 4.5, 7.0, 9.5} as the final depth value for a given pixel. In some embodiments, the cost function can be referred to as an "energy function." Substantially minimizing the cost function may include minimizing the energy function. In one embodiment, the minimizing the cost function smoothes differences between neighbor locations.

Figure 4:
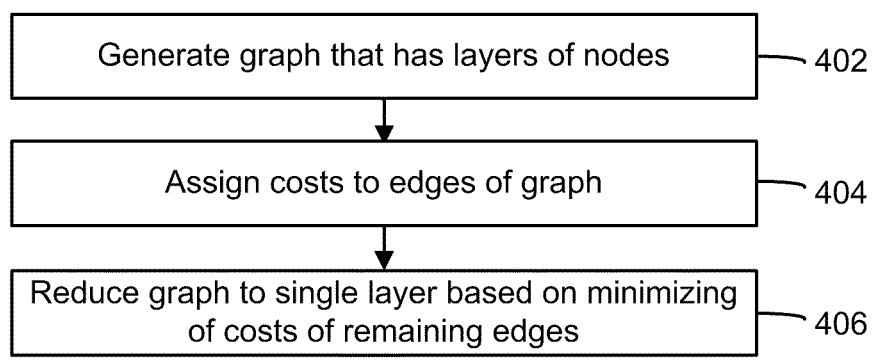
FIG. 4 is a flowchart of one embodiment of a process of forming a cost function.

FIG. 4 is a flowchart of one embodiment of a process 400 of forming a cost function. Process 400 is one embodiment of step 306 of process 300. For purposes of discussion an example in which the locations in the depth image corresponds to pixels in the depth image will be used. Note that the locations are not required to correspond to single pixels. In step 402, a graph is constructed that includes a plurality of layers of nodes. Each pixel is represented by one node in each layer in this example. The potential depth values for a given pixel are represented by nodes in different layers.

Figure 5D:
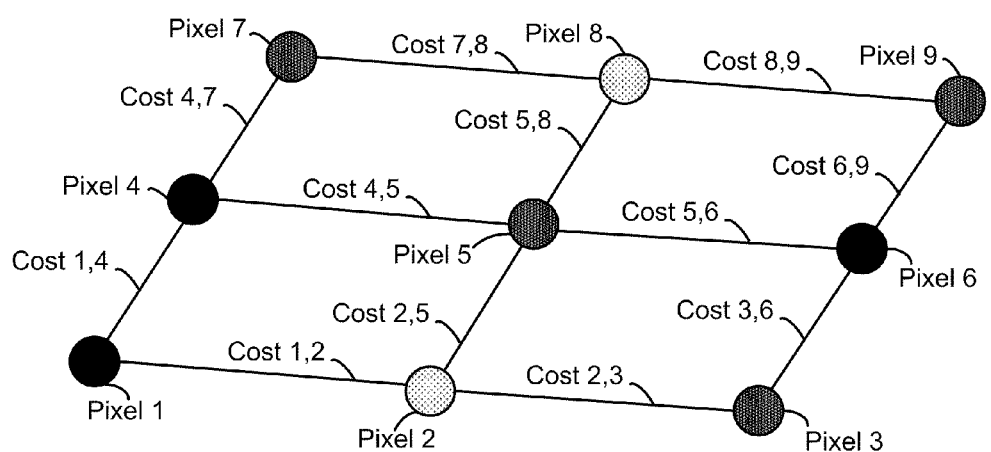
FIG. 5D shows cost assigned to the edges between each pair of nodes.
Figure 5B:
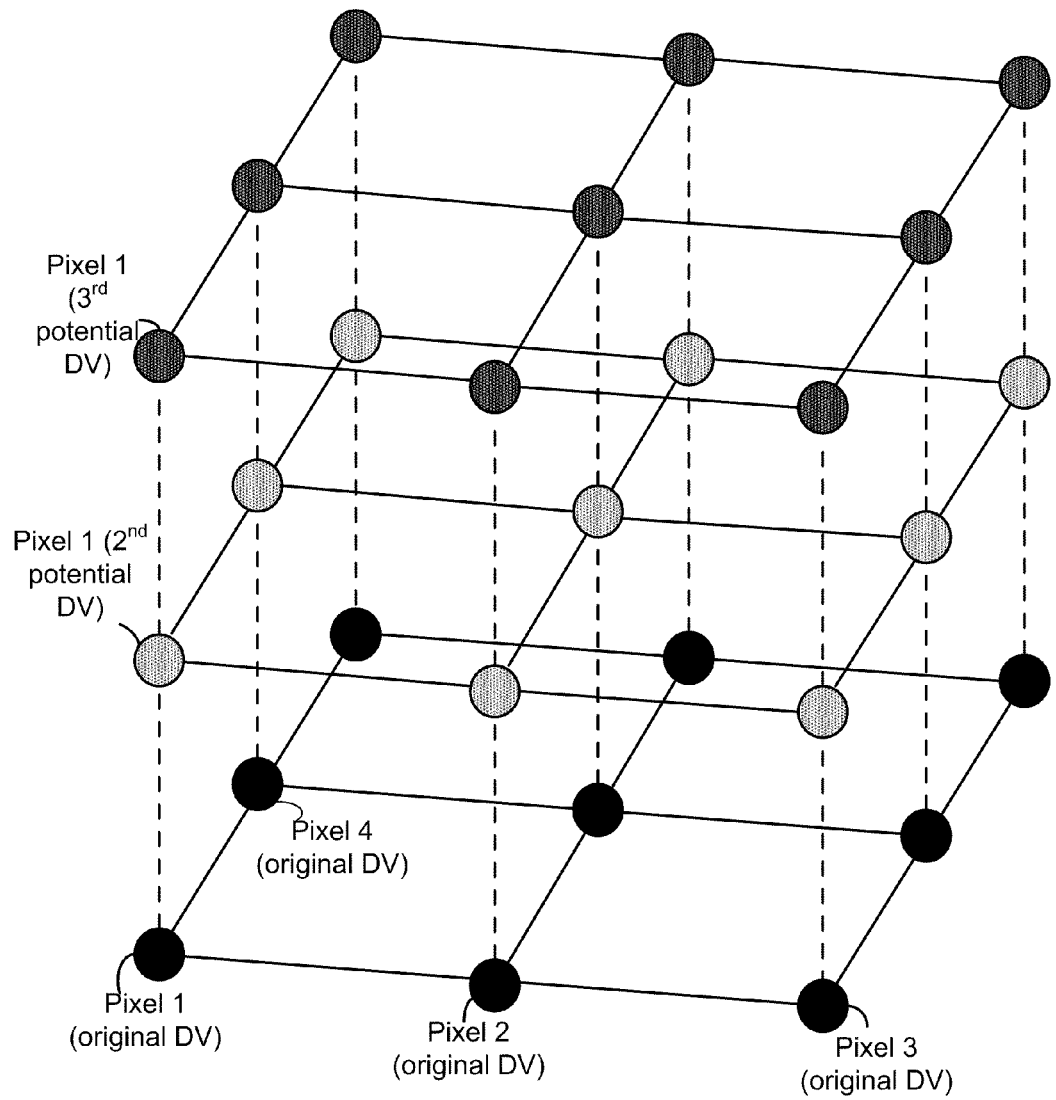
FIG. 5B depicts an example graph that may be formed in the process of FIG. 4.

FIG. 5B depicts an example graph that may be formed in step 402. Note that the graph of FIG. 5B uses the structure of FIG. 5A as a starting point. Thus, the graph is for the same nine pixels from FIG. 5A. Each pixel is represented by one node at each layer of the graph. The example graph has three layers. Each layer corresponds to different potential depth values. Each node in the bottom layer of the graph corresponds to the depth value from the original depth image for one pixel. For example, one node has the depth value for Pixel 1 from the original image, another node has the depth value for Pixel 2 from the original image, another node has the depth value for Pixel 3 from the original image, etc. The bottom layer of the graph is the equivalent of the depth image of FIG. 5A. Note that original depth values at the bottom layers are referred to a "potential" depth values because due to aliasing some of the original depth values will be changed to de-alias the depth image.

The two upper layers in the graph are formed based on other potential depth values for each pixel. For example, the second layer may be formed by adding 2.5 m to each depth value at the lower layer, assuming a depth window of 2.5 m. The third (upper) layer may be formed by adding 5.0 m to each depth value at the lower layer. Thus, Pixel 1 may have a depth value of 2.0 m. 4.5 m, and 7.0 m from lowest to highest layer. Note that it is not required that a given pixel be present at each layer. In some embodiments, the graph is a Markov Random Field (VIRF) graph. Also, some layers may have depth values that are lower than the original values.

Figure 5C:
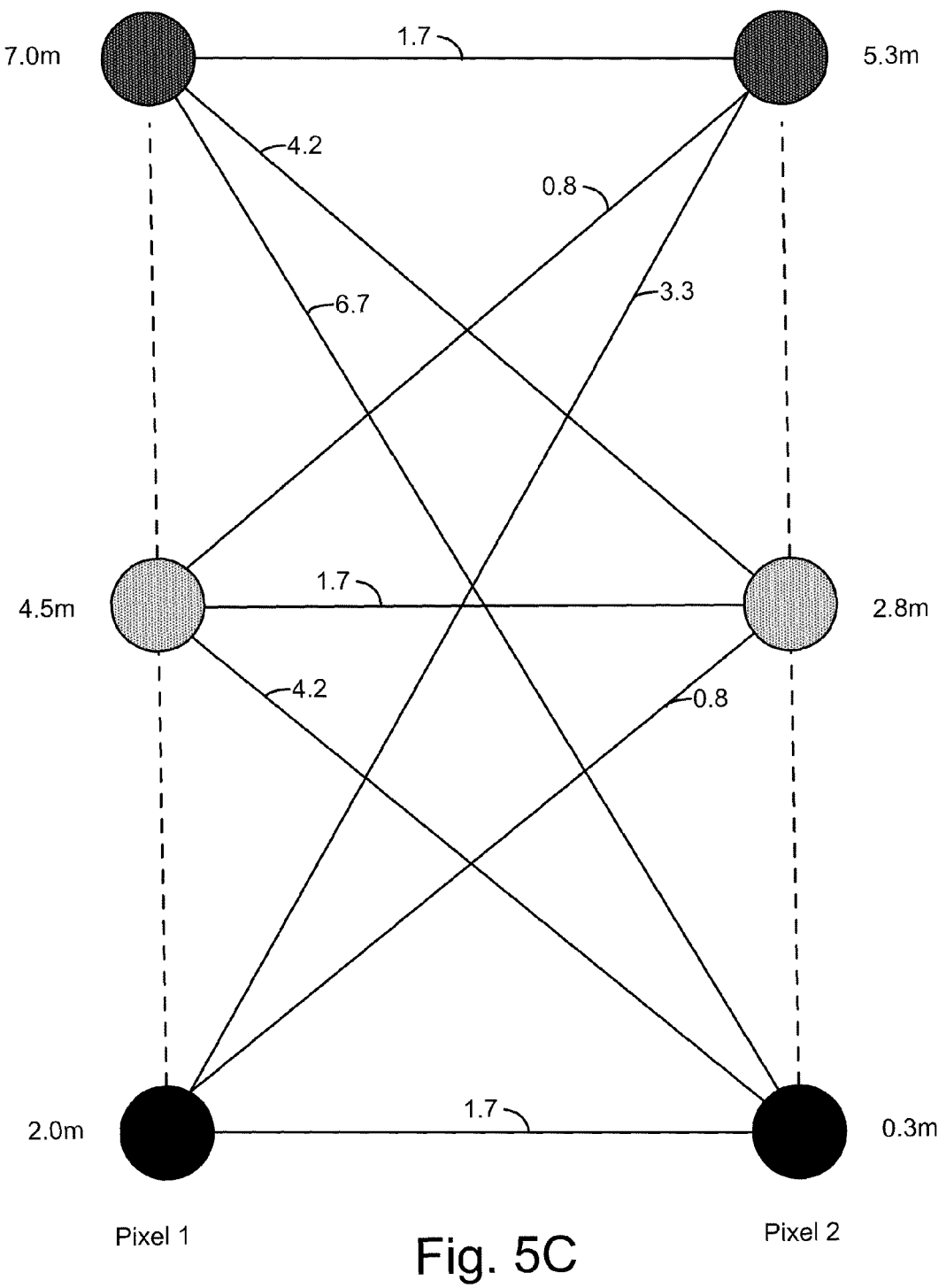
FIG. 5C depicts an example of costs assigned to edges between pixels.

In step 404, costs are assigned to edges of the graph based on a depth difference between the potential depth values of the two nodes that are connected by the edge. FIG. 5C depicts an example of costs assigned to edges between Pixel 1 and Pixel 2. The solid lines indicate edges in the graph. The dashed lines are to illustrate different nodes that represent the same pixel. Thus, each node for a given pixel has an edge to every node of its neighbor pixel in this example.

FIG. 5C shows that at the lowest layer Pixel 1 has a value of 2.0 m and Pixel 2 has a value of 0.3 m. These values may be from the original depth image. Pixel 1 has been assigned the values 4.5 m and 7.0 m at the second and third layers, respectively. These values are based on the size of the depth window. Pixel 2 has been assigned the values 2.8 m and 5.3 m at the second and third layers, respectively. These values are also based on the size of the depth window.

The edges have been assigned a cost that is based on the difference in potential depth value for each node. For example, the edge that connects the nodes at the lowest level is labeled 1.7, which corresponds to the difference between the potential depth values of Pixel 1 and Pixel 2 at that level. In some embodiments, the cost increases with greater differences in potential depth values between neighbor nodes. However, the cost does not need to equal the difference in potential depth values, as in this example.

Returning again to the graph of FIG. 5B, Pixel 1 also is a neighbor to Pixel 4. Likewise, Pixel 2 is a neighbor to Pixels 3 and 5. Therefore, additional costs are determined for edges to those neighbor nodes. Nodes for all pixels may be processed such that all edges are assigned a cost. Note that not all of the edges that connect nodes are depicted in FIG. 5B so as to not obscure the diagram.

In step 406, the graph is reduced to a single layer based on minimizing the costs of remaining edges. Each of the pixels has one node in the reduced graph. FIG. 5D depicts results in which the graph of FIG. 5B has been reduced to a single node for each pixel. The depth value for each node comes from one of the different layers. For example, Pixel 2 is represented by the potential depth value that was at the second layer of the graph of FIG. 5B. The structure of FIG. 5D shows that the edges between each pair of nodes have a cost assigned. This is the cost that is based on the final depth values. For example, the cost of the edge between Pixel 1 and Pixel 2 is based on the difference between the final depth values of Pixel 1 and Pixel 2. In one embodiment, the structure of FIG. 5D is generated based on minimizing the summation of all of the edge costs. For example, the summation of all of the costs in FIG. 5D may be the minimum that can be arrived at from reducing the graph of FIG. 5B to a single layer. However, note that other factors can be used to reduce the graph. As will be discussed below, the graph may also be reduced based on costs assigned to individual nodes. In some embodiments, step 406 can be implemented by MRF energy minimization methods.

Figure 6:
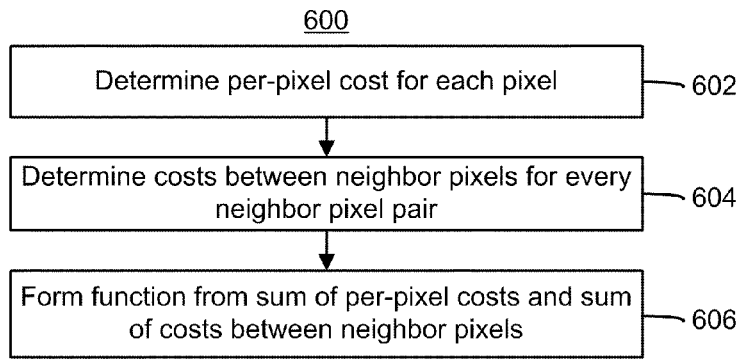
FIG. 6 is a flowchart of one embodiment of a process of determining a cost function.

FIG. 6 is a flowchart of one embodiment of a process 600 of determining a cost function. Process 600 is one embodiment of step 306 of process 300. In process 600, the locations that are processed are pixels. As mentioned, one variation is to form locations from groups of contiguous pixels.

In step 602, a per-pixel cost is determined for each pixel. The per-pixel cost is a cost that is assigned to pixels. In one embodiment, the per-pixel cost is a cost that is based on a property of the pixel itself, such as its brightness. In one embodiment, a pixel is assigned a per-pixel cost based on its brightness. Further details of assigning a per-pixel cost based on the brightness of a pixel are described below.

The per-pixel cost may be expressed by Equation 1.

$$d_p(l_p) \qquad \text{Equation 1}$$

In Equation 1, the number of pixels is "p." Each pixel may actually assigned different values depending, for example, on which layer of the graph it is in. Referring to FIG. 5B, the per-pixel cost can be thought of as assigning a cost to the nodes in the graph. Therefore, the per-pixel cost could also be referred to as a per-node cost. For example, Pixel 1 may have a cost of "0" at the highest layer, a cost of "−1" at the middle layer, and a cost of "−1" at the lowest layer. Thus, an individual cost may be determined for each potential depth value for each of the locations (e.g., pixels) in the depth image. In Equation 1, the term "$l_p$" indicates that the per-pixel cost is a function of the layers in the graphs.

In step 604, costs between neighbor pixels are determined for every pair of neighbors. In one embodiment, the cost is based on a depth difference between the potential depth value of a first location (e.g., pixel) and the potential depth value of the neighbor location. This has already been described with respect to the example of FIG. 5C.

The cost between two neighbor pixels may be expressed by Equation 2.

$$v_{p,q}(l_p, l_q) = |l_p - l_q| \qquad \text{Equation 2}$$

In Equation 2, "p" and "q" refer to a pair of neighbor nodes. For example, FIG. 5C depicts nine pairs of neighbor nodes. The three nodes for Pixel 1 may correspond to "$l_p$" and the three nodes for Pixel 2 may correspond to "$l_q$". The function $v_{p,q}(l_p, l_q)$ may be referred to as a smoothness function, which is the cost between two neighboring pixels. For example, the costs on the edges of the graph in FIG. 5C are costs between a pair of neighbor pixels. As depicted in Equation 2, the smoothness function may be the absolute value of the difference between the potential depth value of two neighboring pixels. The smoothness function may have many other forms.

In one embodiment, the cost is based penalizing large differences in potential depth values between a pair of neighbor pixels. For example, a pair of neighbor pixels whose true depth is likely to be about the same have some costs between them penalized. Referring to FIG. 5C, the cost of some of the edges between Pixel 1 and Pixel 2 may be penalized, as an example. Further details of penalizing some costs between neighbor pixels are described below.

In step 606, a function is formed from the sum the per-pixel costs and the costs between neighbor pixels. Equation 3 shows one embodiment of the cost function.

$$E = E_d + \lambda E_s \qquad \text{Equation 3}$$

In Equation 1, $E_d$ is a data term, $E_s$ is a smoothness term, and λ is a scaling factor. Equation 4 shows one example of the data term. Equation 5 depicts one example of the smoothness term.

$$E_d = \Sigma_p d_p(l_p) \qquad \text{Equation 4}$$

$$E_s = \Sigma_{\{p,q\} \in N} v_{p,q}(l_p, l_q) \qquad \text{Equation 5}$$

Note that Equation 4 is formed by summing the per-pixel costs for all pixels. Equation 5 is formed by summing the costs between neighbor pixels for "N," which is the set of all neighboring pairs. The cost function in the above equations may be considered to be an energy function. In some embodiments, the step of minimizing the cost function (step 308, process 300) may be considered to be an energy minimization problem.

In some embodiments, additional hints are used to determine the cost function. One example of this is to use brightness information. In one embodiment, the brightness of a pixel is used to adjust the per-pixel value. Note that the brightness of a pixel may correspond to its true depth. For example, brighter pixels may be expected to be closer and dimmer pixels further. Therefore, brightness can be used in the cost function. As specific example, if a pixel is determined to be dim, then a lower cost can be assigned to nodes in the graph for which the pixel has a greater potential depth.

Figure 7:
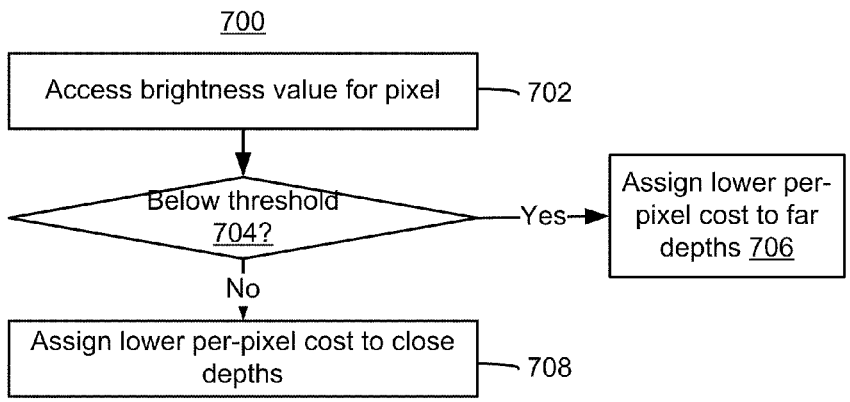
FIG. 7 is a flowchart of one embodiment of a process of determining a per-pixel cost based on brightness.

FIG. 7 is a flowchart of one embodiment of a process 700 of determining a per-pixel cost based on brightness. Process 700 is one embodiment of step 602 of process 600. Process 700 describes processing one pixel and may be repeated for other pixels. In step 702, a brightness value is accessed for a pixel. In one embodiment, the brightness values are generated by the same process that generates the depth image. For example, a brightness image is generated from data collected by a light detector that may also be used in a process that generates the depth image based on times-of-flight. Therefore, brightness values from the brightness image can be correlated to the depth image to determine a brightness value for a pixel in the depth image.

In step 704, the brightness value for the pixel is compared to a threshold value. If the brightness value is less than the threshold, then the per-pixel cost for far depths are reduced in step 706. The per-pixel cost for other depths may stay at a default value. For example, the threshold value is set such that the pixel is expected to be relatively far from the depth camera. Therefore, relatively far depth values should be favored over relatively small depth values. As one example, if the potential depth value is greater than 4.5 m, then the per-pixel cost may be set to −1. If the potential depth value is less than 4.5 m, then the per-pixel cost may be set to 0. In one embodiment, step 704 includes assigning a cost to each node for a given pixel. For example, all of the nodes for Pixel 1 in the graph of FIG. 5B may be assigned a cost. In one embodiment, step 704 includes determining values for Equation 1 for a given pixel.

If the brightness value is greater than the threshold, then the per-pixel cost for near pixels may be reduced, in step 708. The per-pixel cost for other depths may stay at a default value. For example, if the potential depth value is less than 4.5 m, then the per-pixel cost may be set to −1. If the potential depth value is greater than 4.5 m, then the per-pixel cost may be set to 0. Process 700 may have many variations. For example, step 708 of lowering costs of near pixels might not be performed. Alternatively, step 706 of lowering costs of far pixels might not be performed. Per-pixel costs could be assigned based on additional categories such as bright, medium, and dim pixels. Note that factors other than brightness values could be used to adjust the per-pixel cost. Referring back to Equations 1 and 2, it may be seen that the effect of pixels lowering per-pixel cost is to favor nodes with the lower costs in the final solution.

Figure 8:
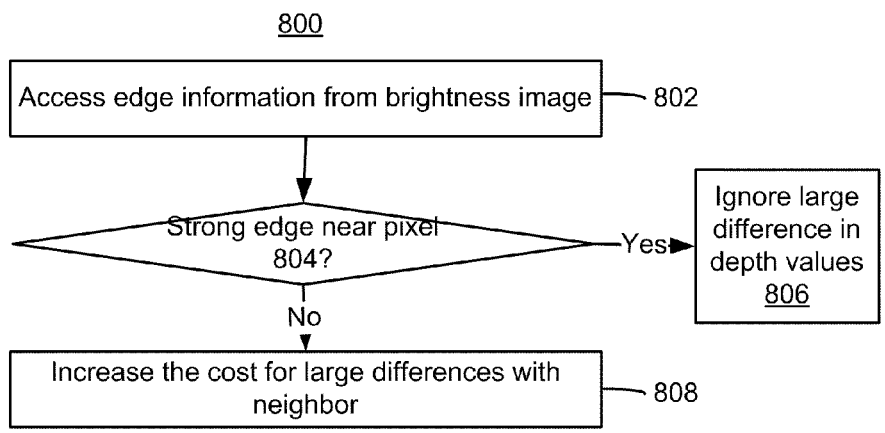
FIG. 8 is a flowchart of one embodiment of a process of modifying the cost between two neighboring pixels based on edge information.

Another example of using additional hints in the cost function is to use edge information. In one embodiment, the edge information is from edges in a brightness image. If two neighboring pixels are not near an edge, this may imply that they should have similar depth values. In one embodiment, edge information is used to modify the cost between two neighboring pixels. FIG. 8 is a flowchart of one embodiment of a process 800 of modifying the cost between two neighboring pixels based on edge information. Process 800 is one embodiment of step 604 of process 600. Process 800 describes processing one pixel and may be repeated for other pixels.

In step 802, edge information is accessed for a pixel. In one embodiment, the brightness values are generated by the same process that generates the depth image. For example, a brightness image is generated from data collected by a light detector that may also be used in a process that generates the depth image based on times-of-flight. Therefore, brightness values from the brightness image can be correlated to the depth image to determine a brightness value for a pixel in the depth image.

In step 804, the edge information is examined to determine whether there is a strong edge near the pixel. If there is a strong edge near the pixel, then large differences in depth values may be ignored (step 806). For example, if the cost between the pixel and its neighbor is high, it may be decreased.

If there is not a strong edge, then the cost between the pixel and its neighbor pixels is penalized in step 808. Equation 6 below shows one possible modification to Equation 2 above in order to apply a penalty to the cost between two pixels when a pixel is not near a strong edge.

$$V_{p,q} = |l_p - l_q| * \begin{cases} a & |r_p - r_q| \leq \text{threshold} \\ b & |r_p - r_q| > \text{threshold} \end{cases} \quad \text{Equation 6}$$

where $0 < b < a$

In Equation 6, $r_p, r_q$ are the brightness values of the pixels and a, b are constants, wherein a>b to provide a lower cost for nodes that do not have similar brightness values. The value "b" is multiplied to the cost for a given pixel pair (p, q) if the brightness difference between the pixel and its neighbor is greater than a threshold (the brightness difference is given by $|r_p - r_q|$). The value "a" is multiplied to the cost for a given pixel pair (p, q) if the brightness difference between the pixel and its neighbor is less than or equal to the threshold. The value "a" may be greater than "b" to increase the cost when the pixels are not near a strong edge.

Figure 9:
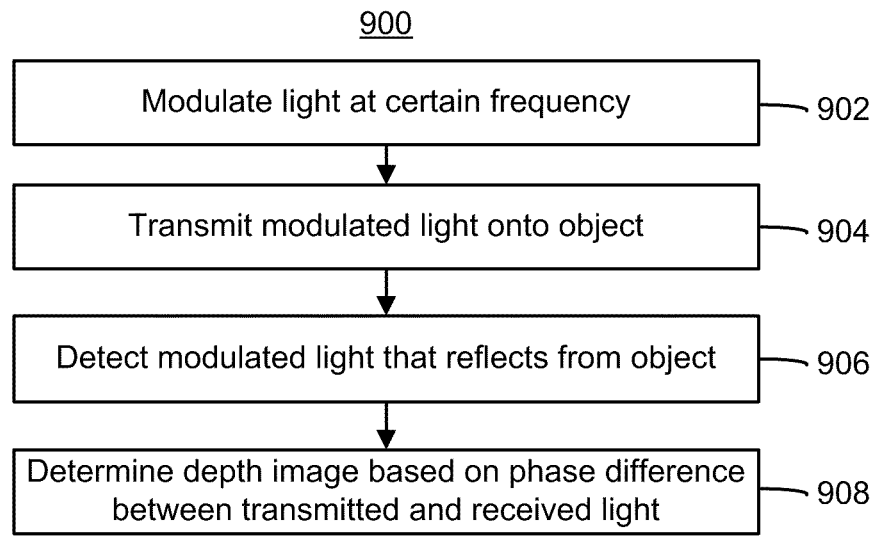
FIG. 9 is a flowchart that describes one embodiment of a process of forming a depth image based on time-of-flight differences.

In one embodiment, the depth image that is processed in process 300 is formed based on time-of-flight differences. FIG. 9 is a flowchart that describes one embodiment of a process 900 of forming a depth image based on time-of-flight differences. Process 900 may be performed by the depth camera 20. In step 902, light is modulated at certain frequency. The frequency will impact the depth window of the camera. Therefore, the frequency may be selected to achieve a desired depth window. The modulation may include, but is not limited to, amplitude modulation, frequency modulation, and phase modulation.

In step 904, the modulated light is transmitted from the camera 20 into an object 8 in the field of view of a camera 20. For example, the depth detection light transmitter 24 in camera 20 transmits the light. In step 906, light that reflects from the object 8 is received. For example, the detection light receiver 25 in camera 20 receives the reflected light. In some embodiments, the light is detected by a CCD or CMOS device, which may include a number of pixels.

In step 908, a depth image is determined based on the phase difference between the transmitted and received light. In some embodiments, a depth value is determined for a number of pixels. For example, the CCD or CMOS device may have an array of pixels. Therefore, a depth image such as represented by the example in FIG. 5A may be generated.

Figure 10:
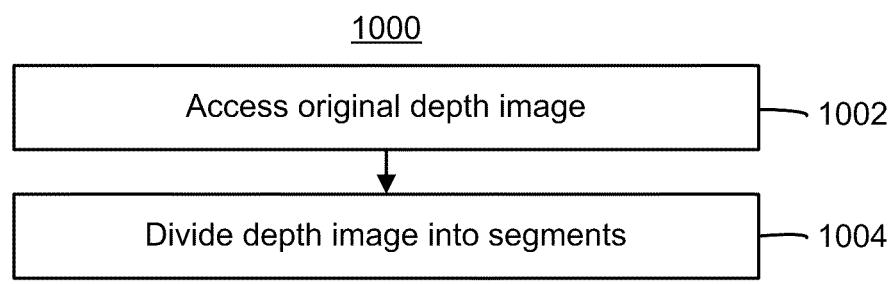
FIG. 10 is a flowchart of one embodiment of a process that divides an original depth image into segments.

In one embodiment, the original depth image is divided into segments prior to de-aliasing. The segments may include contiguous pixels that have about the same depth values. FIG. 10 is a flowchart of one embodiment of a process 1000 that divides an original depth image into segments. Process 1000 is one embodiment of step 302 of process 300. In step 1002, an original depth image is accessed. For example, the depth image that is created by process 900 is accessed.

In step 1004, the depth image is divided into segments. In one embodiment, each of the segments includes pixels for which there is not a large depth difference between each pixel and its neighbor. Note that the difference between the pixel with the smallest and highest depth value could be large if they are not neighbor pixels. Referring to process 300, in which "locations" are processed, each segment may correspond to a location. In one embodiment, a flood fill algorithm is performed to change the depth values of a contiguous group of pixels by applying the same bias value to all the pixels in the group.

Figure 11:
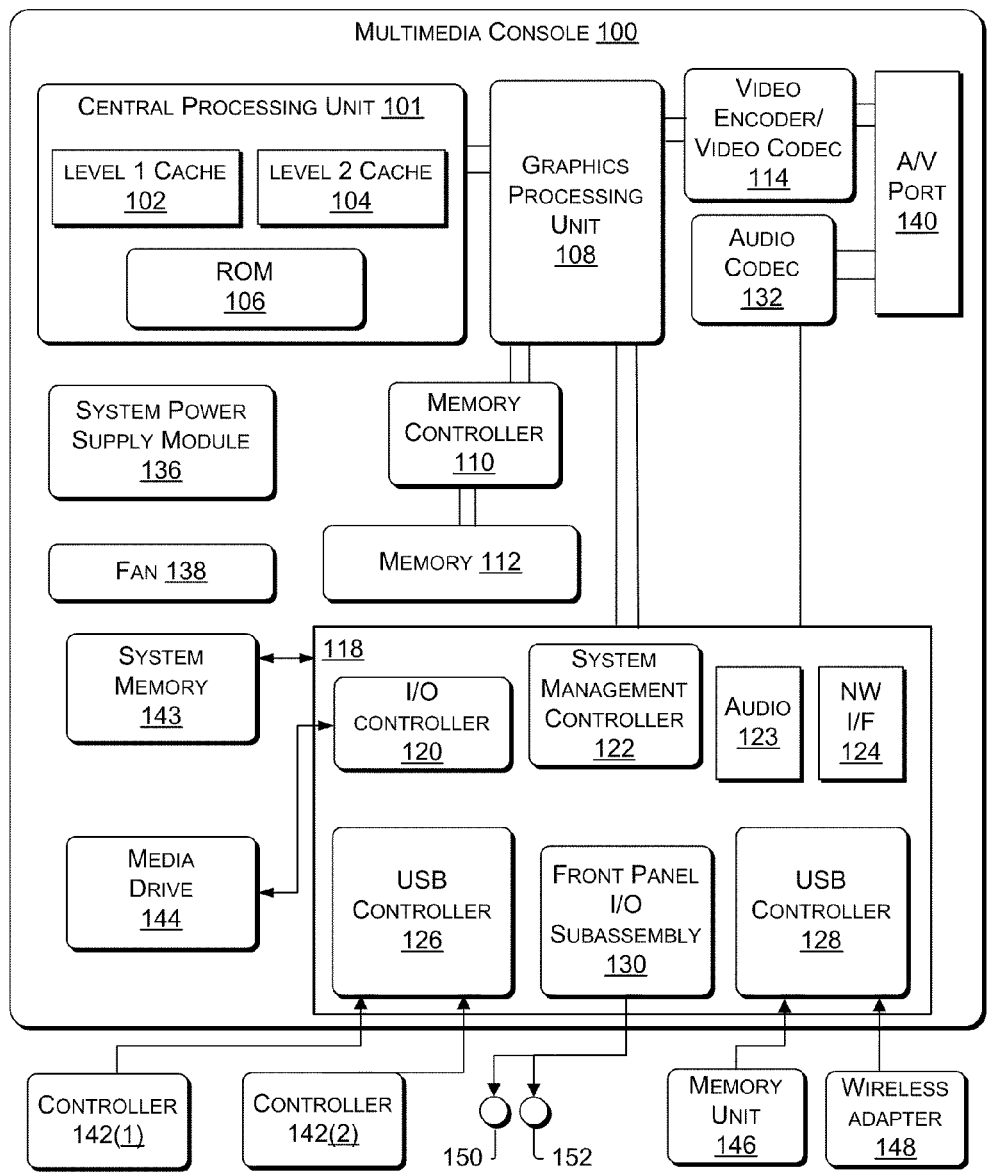
FIG. 11 depicts an example block diagram of a computing environment that may be used in the motion capture system of FIG. 1.

FIG. 11 depicts an example block diagram of a computing environment that may be used in the motion capture system of FIG. 1. The computing environment can be used to de-alias depth images. The computing environment such as the computing environment 12 described above may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that may be implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation may be large enough to contain the launch kernel, concurrent system applications and drivers. The CPU reservation is may be constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory for an overlay may depend on the overlay area size and the overlay may scale with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications may be scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager may control the switching of input stream, without knowledge the gaming application's knowledge and a driver maintains state information regarding focus switches. The console 100 may receive additional inputs from the depth camera system 20 of FIG. 2, including the camera 28.

Figure 12:
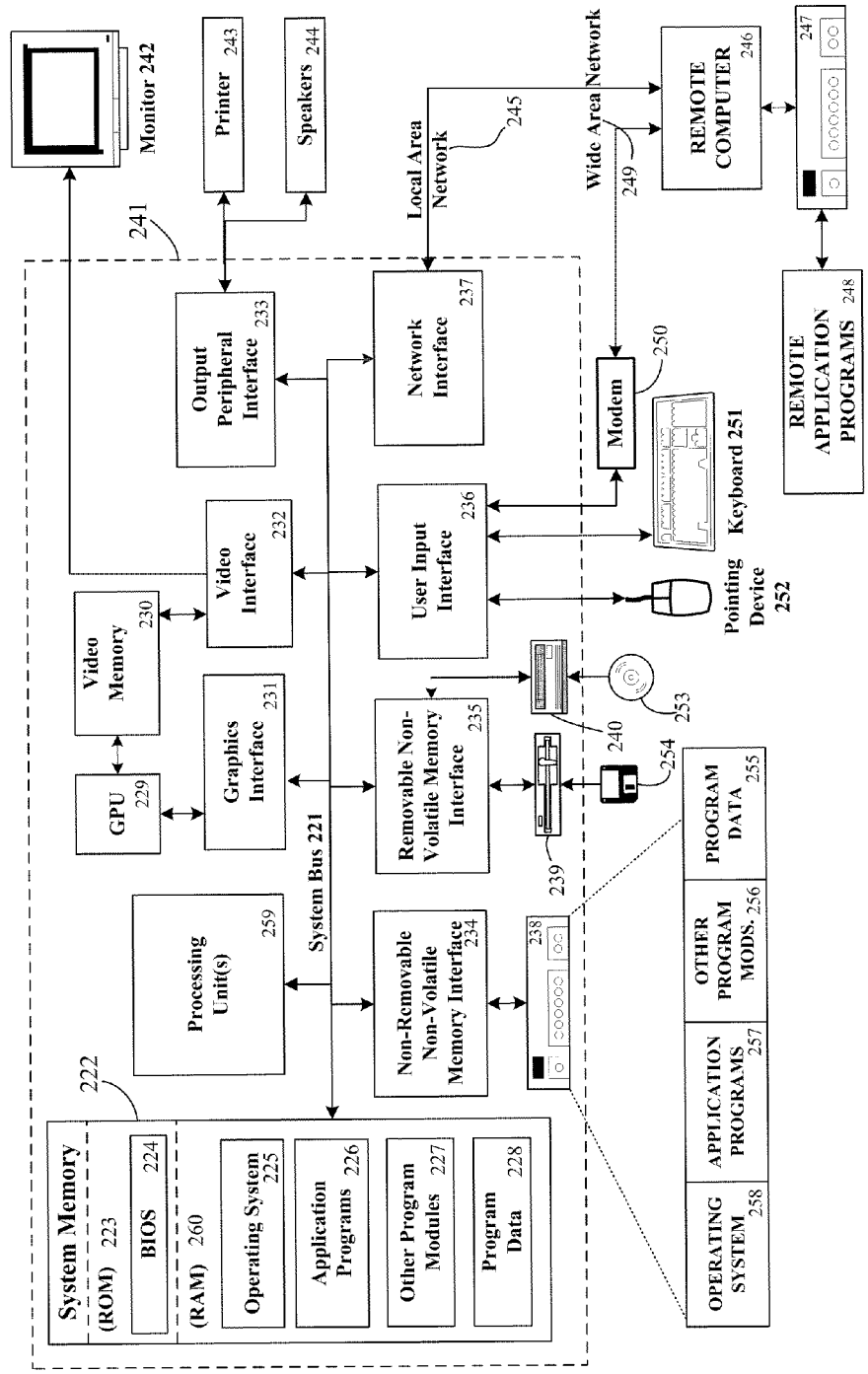
FIG. 12 depicts another example block diagram of a computing environment that may be used in the motion capture system of FIG. 1.

FIG. 12 depicts another example block diagram of a computing environment that may be used in the motion capture system of FIG. 1. The computing environment can be used to de-alias depth images. The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or non-volatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, FIG. 12 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 12, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including camera 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 12. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 12 depicts remote application programs 248 as residing on memory device 247. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A machine-implemented method, comprising:
   accessing a depth image that includes a depth value for each of a plurality of locations in the depth image, each of the locations has one or more neighbor locations;
   determining a plurality of potential depth values for each of the plurality of locations based on the depth value in the depth image for the location and potential aliasing in the depth image;
   determining a cost function based on differences between the potential depth values of each location and its one or more neighbor locations, determining the cost function includes assigning a higher cost for greater differences in potential depth values between a pair of neighbor locations, determining the cost function includes determining whether a pair of neighbor locations are likely to have about the same depth in a scene that corresponds to the depth image, determining the cost function includes penalizing large differences in potential depth values between pairs of neighbor locations that are determined to likely have about the same depth, the determining whether a pair of neighbor locations are likely to have about the same depth in a scene that corresponds to the depth image includes:
      accessing a brightness image of the scene that corresponds to the depth image;
      detecting edges in the brightness image; and
      determining whether the pair of neighbor locations are likely to be at about the same depth based on the detected edges, the penalizing large difference in potential depth values between the pair of neighbor locations that are determined to likely have about the same depth includes increasing the cost of the pair of neighbor locations that are not near a strong edge, further comprising ignoring large differences in depth for pixels that are near a strong edge; and
   substantially minimizing the cost function to select one of the potential depth values for each of the locations.

2. The machine-implemented method of claim 1, wherein the determining a cost function includes:
   for each potential depth value of a first location in the depth image, determining a cost for each potential depth value of each neighbor location, the cost is based on a depth difference between the potential depth value of the first location and the potential depth value of the neighbor location; and
   repeating the determining a cost for each potential depth value of each neighbor location for each location in the depth image.

3. The machine-implemented method of claim 2, wherein the determining a cost function further includes:
   determining an individual cost for each potential depth value for each of the locations in the depth image.

4. The machine-implemented method of claim 3, wherein the determining an individual cost for each potential depth value for each of the locations in the depth image includes assigning an individual cost to each potential depth value for a first location in the depth image based on a brightness value at the first location.

5. The machine-implemented method of claim 1, wherein accessing a depth image that includes a depth value for a plurality of locations includes:
   accessing a depth value for a plurality of pixels in the depth image; and
   dividing the depth image into a plurality of segments, each of the segments include a plurality of pixels having a neighbor with approximately the same depth value, each segment is a location of the plurality of locations.

6. The machine-implemented method of claim 1, wherein each of the plurality of locations corresponds to a pixel in the depth image, the depth image is associated with a depth window, the determining a plurality of potential depth values is further based on the depth window.

7. An apparatus, comprising:
a processor; and
a computer readable storage medium coupled to the processor, the computer readable storage medium having instructions stored thereon which, when executed on the processor cause the processor to access a depth image that includes a depth value for a plurality of locations, each of the locations has one or more neighbor locations, the instructions further cause the processor to access a depth window associated with the depth image, the instructions further cause the processor to determine a plurality of potential depth values for each of the plurality of locations based on the depth value in the depth image and potential aliasing in the depth image, the potential aliasing is based on the depth window, the instructions further cause the processor to determine a cost function based on differences between the potential depth values of each location and its one or more neighbor locations, to determine the cost function the processor assigns a higher cost for greater differences in potential depth values between a pair of neighbor locations, the instructions further cause the processor to substantially minimize the cost function to select one of the potential depth values for each of the locations, wherein the instruction which cause the processor to determine the cost function further cause the processor to determine whether a pair of neighbor locations are likely to have about the same depth in a scene that corresponds to depth image and to penalize large differences in potential depth values between the pair of neighbor locations that are determined to likely to have about the same depth, wherein the instructions further cause the processor to access a brightness image of the scene that corresponds to the depth image, detect edges in the brightness image, and deterring whether the pair of neighbor locations are likely to be at about the same depth based on the detected edges, the instructions further cause the processor to increase the cost of the pair of neighbor locations that are not near a strong edge and to ignore large difference in depth values for pixels that are near a strong edge.

8. The apparatus of claim 7, wherein the instructions which cause the processor to determine a cost function cause the processor to determine a cost for each potential depth value of each neighbor location for each potential depth value of a first location in the depth image, the cost is based on a depth difference between the potential depth value of the first location of the potential depth value of the neighbor location, the instructions cause the processor determine a cost with each potential depth value of each neighbor location for each location in the depth image.

9. The apparatus of claim 8, wherein the instructions which cause the processor to determine a cost function further cause the processor to determine an individual cost for each potential depth value for each of the locations in the depth image.

10. The apparatus of claim 9, wherein the instructions which cause the processor to determine an individual cost for each potential depth value for each of the locations in the depth image cause the processor to assign an individual cost to each potential depth value for a first location in the depth image based on a brightness value at the first location.

11. The apparatus of claim 8, wherein the instructions which cause the processor to access a depth image cause the processor to access a depth value for a plurality of pixels in the depth image, and divide the depth image into a plurality of segments, each of the segments include a plurality of pixels with a neighbor pixel having approximately the same depth value, each segment is a location of the plurality of locations.

12. The apparatus of claim 8, wherein each of the plurality of locations corresponds to a pixel in the depth image.

13. A machine-implemented method, comprising:
generating a depth image that includes a plurality of pixels, each pixel has one or more neighbor pixels, each pixel having a depth value, the depth image having a depth window;
determining a plurality of potential depth values for each of the plurality of pixels based on the depth window and the depth value in the depth image for the pixel;
generating a graph that includes a plurality of layers of nodes, each pixel is represented by one node in each layer, the potential depth values for a given pixel are represented by nodes in different layers, pairs of nodes that correspond to neighbor pixels are connected by edges;
assigning a cost to each of the edges, the cost of a given edge is based on a depth difference between the potential depth values of the pair of nodes that are connected by the edge;
accessing a brightness image of a scene that corresponds to the depth image;
detecting edges in the brightness image;
determining pairs of neighbor pixels that are likely to be at the same depth in the scene based on the detected edges;
for pairs of neighbor pixels that are likely to be at the same depth in the scene, determining which edges connect nodes that have a difference in potential depth values that is greater than a pre-determined threshold;
the assigning a cost to each of the edges includes increasing the cost of the edges that connect nodes that have a difference in potential depth values that is greater than a pre-determined threshold; and
for pairs of neighbor pixels that are not likely to be at the same depth in the scene, for assigning a cost to each of the edges included decreasing the cost of the edges that connect nodes that have a difference in potential depth values that is greater than a pre-determined threshold; and
reducing the graph to a single layer based on minimizing the costs of remaining edges, each of the pixels has one node in the reduced graph.

14. The machine-implemented method of claim 13, wherein generating the depth image includes:
modulating light at a first frequency;
transmitting the modulated light onto an object in a field of view of a camera;
receiving light that reflects from the object;
comparing a phase of the modulated transmitted light with a phase of the received light; and
determining the depth image based on phase difference between the transmitted and received light and the first frequency.

15. The machine-implemented method of claim 13, further comprising:
determining a per-node cost for each of the nodes based on a brightness of the pixel that corresponds to the node, wherein the reducing the graph to a single layer substantially minimizes a sum of the costs of remaining edges and the per-node costs.

* * * * *